United States Patent Office 3,289,796
Patented Dec. 6, 1966

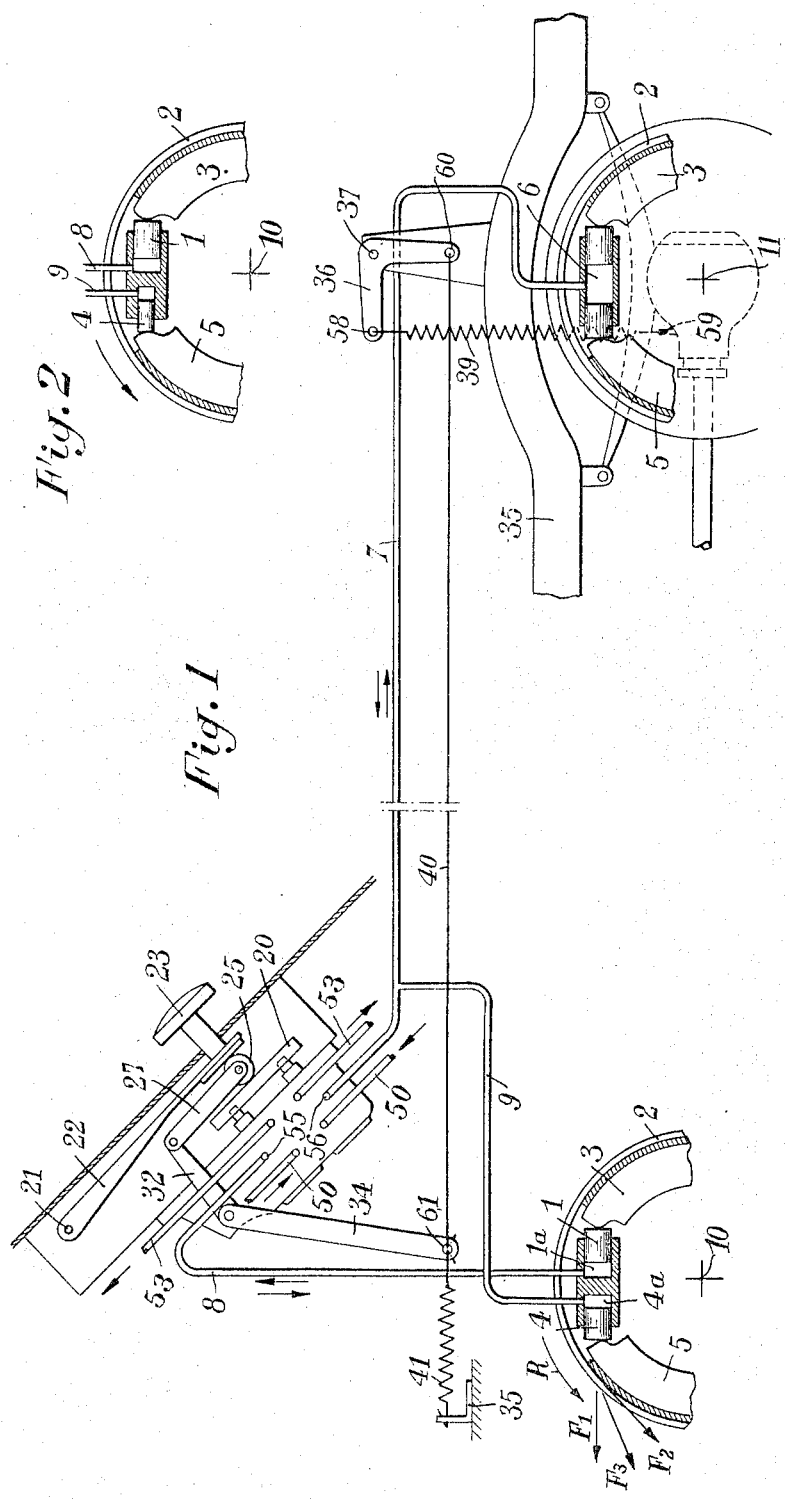

3,289,796
LOAD RESPONSIVE BRAKE SYSTEM
Jean Cadiou, Paris, France, assignor to Societe Anonyme Andre Citroen, Paris (Seine), France
Filed July 6, 1965, Ser. No. 469,738
4 Claims. (Cl. 188—152)

It is known that for a given effort exerted on the brake pedal the deceleration obtained in a vehicle is greater under no-load conditions than under loaded conditions.

If a servo-action device is provided in order to have a very high braking efficiency even under full-load conditions, the brake responsiveness becomes too pronounced under no-load conditions.

This inconvenience is further accentuated in the case of servo-action braking systems comprising two separate circuits with means for properly distributing the braking effort among the front and rear axles as a function of the load distribution, for example as described and illustrated in the U.S. Patent No. 2,929,660. In fact, with this arrangement the trend is to apply the brakes with a proportionally greater force on the front axle than on the rear axle, and since by construction the front axle is more sensitive to variations in the braking torque, light brake applications in an unloaded vehicle are not sufficiently progressive.

On the other hand it is known that the lack of progressiveness of a conventional brake system is due for the greater part to the so-called "compressed" brake shoe, but this inconvenience cannot be alleviated without reducing the desired full-load braking efficiency.

This invention is concerned with an arrangement capable of solving the problem set forth hereinabove.

This arrangement consists in applying to the piston of the brake cylinder controlling the so-called "compressed" shoe of the front brake fluid at the same pressure as that delivered to the rear brake. Thus, this pressure is low when the vehicle is unloaded, since the braking effort distributor reduces the fluid pressure in the rear brake for increasing the fluid pressure in the front brake. The necessary braking force complement for the front brake is provided by the "tensioned" shoe fed with high-pressure fluid from the distributor.

In case the vehicle is in full-load conditions, the distributor will increase the rear axle brake circuit fluid pressure and therefore the fluid pressure in the "compressed" front brake while reducing the pressure in the "tensioned" front brake, whereby the front and rear braking torques will be proportional to the loads supported by the wheels.

A typical form of embodiment of a selective brake control device according to this invention will now be described in detail with reference to the attached drawing in which:

FIGURE 1 is a diagram showing the hydraulic fluid distribution to the brakes of the front and rear axles of the vehicle.

FIGURE 2 is a detail view showing a brake cylinder having different piston diameters for controlling the compressed and tensioned shoes.

The vehicle illustrated diagrammatically in the drawing is equipped with drum brakes on the front and rear axles 10, 11 respectively; the shoes 3 and 5 of each brake are pivoted at one end, not shown according to the known construction and their free ends are controlled by pistons 1, 4 sliding in hydraulic cylinders 1a, 4a for pressing the shoes 3, 5 against the relevant drum 2.

Assuming that the wheel (not shown) revolves in the direction of the arrow R, when the hydraulic pressure is applied the piston 4 moves in the direction $F_1$, thus creating a frictional force $F_2$ tangential to the drum on the side of the friction lining 5, whereby the resultant braking force $F_3$ is increased while the braking force exerted on the other lining 3 is decreased. Therefore the braking force progressiveness is unequal on the side of the compressed shoe 5 with respect to the tensioned shoe 3.

This state of unbalance obtaining in the braking action may take place in both axles, but in the example illustrated it is assumed that it occurred mainly in the normally loaded front axle.

To avoid this inconvenience and according to the present invention, the hydraulic pipe line 8 connected by means of an orifice 55 to the slide valve of the hydraulic distributor of the type described for example in the aforesaid U.S. Patent No. 2,929,660, which is connected to the fluid reservoir through feed and return lines 50 and 53 respectively, is also connected to the cylinder 1a controlling the tensioned shoe 3 of the front axle brake 10, another pipe line 7 fed at 56 being connected to the cylinder 6 of rear axle 11 and comprising a branch section 9 also adapted to supply pressure fluid to the cylinder 4a of the compressed shoe 5 of the front axle 10.

The distribution of the braking force among the cylinders 4a and 6 on the one hand and cylinder 1a on the other hand is adjusted by the action exerted by the brake pedal 23, mounted on the end of an arm 22 pivoted at 21, on the roller 25 engaging the compensator lever 20 of which the position is subordinate in the known manner to the position of the cranked levers 32, 34 connected at 61 to the cable 40 responsive at one end to a tension spring 41 attached to a fixed point of the frame 35 of the vehicle and at the opposite end to the suspension spring 39 anchored to a point 59 of the rear axle and to one end 58 of a bell-crank lever 36 fulcrumed at 37 and having its other end 60 attached to said cable 40 with the result that the tensioned shoe 3 of the front axle brake is subjected to the high pressure of the loaded axle while the compressed shoe 5 and the shoes 3 and 5 of the rear axle brake are subjected to the lighter pressure of the normally unloaded axle; with this arrangement any excessive engagement of the brake shoes is avoided and the braking action is progressive, while preserving the advantageous feature of a braking force distributed as a function of load conditions.

As shown in FIGURE 2 this selection of the braking pressure applied to tensioned and compressed shoes of each wheel brake may be further improved by differently proportioning the hydraulic cylinders 1 and 4 controlling these shoes.

If desired, this selection may be contemplated for each axle by shunting the pipe line 8 towards the cylinder controlling the tensioned shoe 3 of the rear axle brake.

When the two axles 10 and 11 are loaded, the pressure balance becomes normal due to the movement of the roller 25 on the compensator lever 20 and thus the braking action takes place under normal conditions.

What I claim is:
1. A hydraulic servo-action braking system wherein the braking fluid distribution is compensated as a function of the load distribution of the front and rear axles of the wheels of a vehicle, which comprises a pressure-fluid distributor unit, a pair of metering slide valves in said distributor supplied with pressure-fluid, said valves comprising a high-pressure slide valve and a low-pressure slide valve, a compensator lever regulating the force applied to said slide valves, means responsive to the load distribution on said front and rear axles and adapted to act accordingly on said compensator lever, a brake pedal acting upon said compensator lever to vary the fluid pressure in each slide valve, a brake cylinder for each axle, a piston sliding freely in said cylinder, a compressed brake shoe actuated by said piston, another brake cylinder, a piston sliding freely in said another cylinder, a tensioned brake shoe actuated by said last-named piston, a pipe line connecting said another cylinder to the high-pressure slide valve of said distributor, and another pipe line connecting the first mentioned cylinder to the low-pressure slide valve of said distributor.

2. A hydraulic servo-action braking system wherein the braking fluid distribution is compensated as a function of the load distribution on front and rear axles of the wheels of a vehicle, which comprises a pressure-fluid distributor unit, a pair of slide valves in said distributor supplied with pressure-fluid, said valves comprising a high-pressure slide valve and a low-pressure slide valve, a compensator lever regulating the force applied to said slide valves, at least one arm pivoted on said distributor and operatively connected to said front and rear axles, the position of said arm varying as a function of the load distribution on said axles, a roller pivotally mounted on the end of said arm and bearing on said compensator lever at a variable point defining the pressure difference between the slide valves, a pedal for actuating said roller, a brake cylinder for each axle, a piston sliding freely in said cylinder, a compressed brake shoe responsive to said piston, another brake cylinder, a piston sliding freely in said another cylinder, a tensioned brake shoe responsive to said another piston, a pipe line connecting the cylinder corresponding to said tensioned brake shoe to the high-pressure slide valve of said distributor, and another pipe line connecting the cylinder corresponding to the compressed brake shoe to the low-pressure slide valve of said distributor.

3. A hydraulic servo-action braking system wherein the braking fluid distribution is compensated as a function of the load distribution on front and rear axles of the wheels of a vehicle, which comprises a fluid-pressure distributor unit, a pair of slide valves in said distributor supplied with pressure-fluid, said valves comprising a high-pressure slide valve and a low-pressure slide valve, a compensator lever regulating the force applied to said slide valves, at least one arm pivoted on said distributor and operatively connected to said front and rear axles, the position of said arm varying as a function of the load distribution on said axles, a roller pivotally mounted on the end of said arm and bearing on said compensator lever at a variable point defining the pressure difference between said slide valves, a pedal for actuating said roller, for each one of the normally more loaded axles, a brake cylinder, a piston sliding freely in said cylinder, at least one braking member subjected to compressive efforts during brake application, said braking member having an end pivoted on the relevant wheel and a free end receiving the piston thrust, a pipe line connecting said cylinder to the low-pressure slide valve of the distributor, another brake cylinder, a piston sliding freely in said other brake cylinder and another braking member subjected to tractive efforts during brake application, said braking member having an end pivoted on the relevant wheel and a free end receiving the piston thrust, braking members for each one of the unloaded axles, a cylinder comprising two free sliding pistons acting on said braking members, a pipe line connecting the cylinder of each unloaded axle and the cylinder of the loaded axle on the side of the tensioned braking member to the low-pressure slide valve of said distributor.

4. A hydraulic servo-action braking system wherein the braking fluid distribution is compensated as a function of the load distribution on front and rear axles of the wheels of a vehicle, which comprises a pressure fluid distributor unit, a pair of slide valves in said distributor supplied with pressure-fluid, said valves comprising a high-pressure slide valve and a low-pressure slide valve, a compensator lever regulating the force applied to said slide valves, at least one arm pivoted on said distributor and operatively connected to said front and rear axles, the position of said arm varying as a function of the load distribution on said axles, a roller pivotally mounted on the end of said arm and bearing on said compensator lever at a variable point defining the pressure difference between said slide valves, a pedal for actuating said roller, and for each one of the normally more loaded axles a first brake cylinder, a piston sliding freely in said cylinder, a brake shoe having one end pivoted on the relevant wheel and a free end actuated by said piston on the side of the compressive braking effort, a pipe line connecting said cylinder to the low-pressure slide valve of said distributor, another brake cylinder having a larger cross-sectional area than said first cylinder, a piston sliding freely in said other cylinder, a brake shoe having one end pivoted on the relevant wheel at one end on the side of the tractive braking effort, said another shoe having a free end actuated by the piston sliding in said another cylinder, a pipe line connecting said another cylinder to the high-pressure slide valve of said distributor, and, for each one of the less loaded axles, a third cylinder having a pair of free pistons slidably mounted therein, braking members adapted to be actuated by said last-named pistons and a pipe line for connecting said third cylinder to the pipe line of said another cylinder of each one of said loaded axles.

No references cited.

EUGENE G. BOTZ, *Primary Examiner.*